United States Patent [19]

von Bonin et al.

[11] B 4,001,193

[45] Jan. 4, 1977

[54] ANIONIC SIZES

[75] Inventors: Wulf von Bonin, Leverkusen; Friedhelm Müller, Odenthal; Nikolaus Schön, Leverkusen, all of Germany

[73] Assignee: Bayer Aktiengesellschaft, Germany

[22] Filed: Jan. 28, 1974

[21] Appl. No.: 437,209

[44] Published under the second Trial Voluntary Protest Program on February 3, 1976 as document No. B 437,209.

[30] Foreign Application Priority Data

Jan. 31, 1973 Germany .......................... 2304535

[52] U.S. Cl. .................................. 526/26; 526/15; 162/168 R; 526/49
[51] Int. Cl.$^2$ .............. C08F 222/16; C08F 220/06
[58] Field of Search ................ 260/78.5 R, 78.5 T, 260/80.8

[56] References Cited

UNITED STATES PATENTS

| 3,547,898 | 12/1970 | Shapiro | 260/78.5 |
| 3,635,915 | 1/1972 | Gale | 260/78.5 R |

FOREIGN PATENTS OR APPLICATIONS

| 674,876 | 7/1952 | United Kingdom | 260/78.5 R |
| 1,088,634 | 10/1967 | United Kingdom | 260/78.5 R |

*Primary Examiner*—John Kight, III
*Attorney, Agent, or Firm*—Connolly and Hutz

[57] ABSTRACT

Improved anionic sizes of alkali metal or ammonium salts of copolymers of 0.5–50% by weight of an aliphatic or cycloaliphatic half ester of $\alpha,\beta$-monoolefinisch unsaturated dicarboxylic acids, 6–40% by weight of acrylic and/or methacrylic acid and 40–85% by weight of an aromatic monovinyl compound such as styrene.

3 Claims, No Drawings

ANIONIC SIZES

This invention relates to the sizing of paper or paper-like materials with improved anionic sizes based on copolymers of halfesters of $\alpha,\beta$-unsaturated carboxylic acids, (meth)acrylic acid and aromatic monovinyl compounds which are in the salt form.

German Offenlegungsschrift No. 1,811,579 discloses the use of styrene/maleic acid halfester copolymers in the form of their ammonium salt solutions in combination with starch as sizes for paper. It has been found, however, that ammonium salts of copolymers of partial esters of $\alpha,\beta$-unsaturated carboxylic acids and styrene are not sufficiently effective on unsized paper.

It was an object of this invention to improve these conventional sizes. It was also intended to avoid having to mix these sizes with other, separatey prepared polymer solutions in order to obtain a good sizing effect in conventionally pre-sized or unsized paper.

At the same time, it was desired that the solutions of the polymer used as size would have good flow properties even at high solids concentrations so that they would be technically easier to handle, i.e. the improved sizes should have a good sizing effect at low molecular weights.

The problem was solved by using, as sizes for paper or paper-like materials, solutions of salts of copolymers which are prepared by copolymerisation of halfesters of $\alpha,\beta$-mono-olefinically unsaturated $C_4$–$C_5$ dicarboxylic acids, (meth) acrylic acid and an aromatic monovinyl compound.

This invention therefore relates to improved anionic sizes based on alkali metal or ammonium salts of copolymers of $\alpha,\beta$-mono-olefinically unsaturated $C_4$–$C_5$ dicarboxylic acid halfesters and styrene, characterized in that the copolymers are composed of A. 0.05 – 50 % by weight of copolymerised units of $\alpha,\beta$-mono-olefinically unsaturated dicarboxylic acid halfesters or the corresponding dicarboxylic acid anhydrides which are converted into the halfesters after copolymerization, B. 6 – 40% by weight of copolymerized units of acrylic or methacrylic acid and C. 40 – 85 % by weight of copolymerized units of an aromatic vinyl compound, the sum of the percentages being 100.

The copolymers are prferably composed of 5–30 % by weight of component A, 8–30 % by weight of component B and 20 – 65 % by weight of component C.

The anionic sizes according to the invention are used as aqueous organic solutions, the term solution being used to include both true solutions and colloidal solutions which may contain polymers in a dispersed form. The solutions may be purely aqueous, purely alcoholic or mixed aqueous alcoholic solutions, the alchols used being methanol, ethanol, ethylene glycol, ethylene glycol monomethyl ether, propanol or propylene glycol, but preferably isopropanol. The salts should be unsubstituted ammonium salts ($NH_4^+$) although salts of amines or metals e.g. sodium salts or ethanolamine salts may in principle also be used.

The copolymers are preferably prepared by copolymerising $C_1$ to $C_{18}$ partial esters of $\alpha,\beta$,-mono-olefinically unsaturated dicarboxylic acids which contain 4–5 carbon atoms with (meth) acrylic acid and an aromatic mono-vinyl compound. Alternatively however, the corresponding dicarboxylic acid anhydrides may be polymerized with (meth)acrylic acid and the vinyl monomer, and the anhydride groups may subsequently be converted into the halfester.

The copolymers in the sizes according to the invention may have a statistically distributed or regular structure or the character of block copolymers. The molecular weights (weight average) are between about 5000 and 150,000, preferably between 8000 and 30,000.

The partial esters of $\alpha,\beta$-unsaturated ($C_4$–$C_5$) dicarboxylic acids may be, for example, the partial esters of maleic acid, fumaric acid or itaconic acid. They are preferably partial esters of maleic or fumaric acid an alcohols in which the alcohol group is aliphatic or cycloaliphatic and contains 1 to 18 carbon atoms, preferably 1 to 7 carbon atoms, such as benzyl alcohol, cyclohexanol, isobutanol, n-butanol, n- and iso-propanol, ethanol, methanol an glycolmonometylether. Maleic acid propyl halfesters are particlarly suitable, for example the product obtained by reacting maleic anhydride with isoprpanol in a molar ratio of 1 : 1.

The following armomatic monovinyl compounds may be used: styrene, alkyl styrenes substituted in the nucleus with 1–4 carbon atoms in the alkyl group, chlorostyrenes, $\alpha$-alkyl styrenes containing 1 or 2 carbon atoms in the alkyl group or $\alpha$-methyl-p-isopropyl styrene, styrene itself being preferred.

Acrylic and methacrylic acid are used as unsaturated monocarboxylic acids. Acrylic acid is preferred.

Preparation of the copolymers is carried out by known methods, for example by reacting maleic anhydride with the corresponding alcohol at temperatures of between 50° and 150°C and then directly using the resulting partial ester of $\alpha,\beta$-unsaturated dicarboxylic acid for radical polymerisation with (meth) acrylic acid and the aromatic monovinyl compound at 60°C, to 180°C, preferably 80 – 150°C. If desired using solvents such as alcohols, in particlar ispropanol, and adding dispersing agents such as water and appropriate auxilary agents such as emulsifiers, dispersing agents or molecular weight regulators, e.g. compounds which contain phenol, nitro or SH-groups such as dodecyl mercaptan or hydroxyethyl mercaptan, diisopropyl xanthate disulphide, t-butyl quinone or nitrotoluene.

The ammonium salts of the copolymers may be prepared from primary, seondary or tertiary amines such as methylamine, ethanolamine, dihydroabiethylamine, oleyamine, diisooctylamine, diethanolamine, triethanolamine or tetraethanol-ethylenediamine although they are preferably prepared from ammonia.

The ammonium salts may be prepared using stoichiometric, less than equivalent or excess quantities of amine or ammonia, e.g. 30 – 350 % of the stoichiometrically required quantity, based on the caboxyl groups present. The quantity of amine or ammonia used is preferably 60–260 % of the stoichiometrically required quantity.

The advantage of using less than equivalent quantities of amine or ammonia is that the size when ready for use is practically free from any odour of ammonia and is physiologically harmless. It is advisable, however, to neutralise at least 50 % of the caboxyl groups in the copolymer with amines or ammonia.

Conversion of the copolymers into solutions of the ammonium salts is most suitably carried out by reacting the copolymers either solvent-free or in the form of dispersions or dissolved in water-miscible solvents such as isopropanol with aqueous solutions of amine or ammonia at temperatures of between 30°C and 95°C, preferably between 40°C and 80°C, to yield approximately 5–50 % by weight, preferably 10–35% by weight solutions, e.g. aqueous alcoholic solutions, or dispersions. The term aqueous solutions is intended in this context also to include solutions in which the solvent content is composed of more than 50 % by weight of water, the remainder consisting of a water-miscible medium such as isopropanol.

The partial ester copolymers used may also contain a minor proportion (up to about 30 % by weight) of diester groups or due to saponification reactions or side reactions they may also contain minor proportions of dicaboxylic acid/ammonium salt, imide/ammonium salt or amide/ammonium salt groups. Such side reactions and the secondary products obtained from them generally have no significant effect on the new sizes.

The sizes obtained by the process according to the invention are highly efficient and can be used on unsized or conventionally pre-sized paper and in combination with other sizes. They are preferably applied on the surface but may also be used for sizing in the pulp. They have the advantage of acting as sizes also on paper which contains little or no polyvalent metal ions such as aluminum and they do not impair the effect of white toners. They may be used together with acid, neutral or basic fillers containing casein, chalk or kaolin or in particular with starch.

Another surprising effect of the new sizes is their insensitivity to fluctuations in the pH of the sizing liquor, i.e. the wide range within which they can be used. The new sizes are distinguished by a surprisingly wide range of possible applications, both as regards the character of the type of paper to be sized and as regards the conditions under which the sizes can be applied.

The new sizes are preferably used in the form of purely aqueous alcoholic solutions of their ammonium salts with a solids content of 5 to 50 % by weight. For the paper manufacturing process itself, they are frequently diluted to solids contents of 0.05 to 10 % by weight.

The sizes may be applied by adding them to the paper pulp or by subsequently impregnating or spraying the sheet of paper or by other conventional methods.

The preparation and action of the new sizes will be explained below with the aid of examples. The parts and percentage contents given refer to weight unless otherwise indicated.

Preparation of the sizes will be described below by way of example. The solids contents are determined by evaporation tests at 130°C.

Size A 2000 parts of isopropanol and 1200 parts of maleic anhydride are introduced into an autoclave and heated to 120°C to form the halfester. A mixture of 2700 parts of styrene, 500 parts of acrylic acid, 20 parts of t-butylhydroperoxide and 25 parts of t-butylperoctoate is then added at the same temperature in the course of 3 hours.

The resulting copolymer consists of copolymerised units of about 37.8 % by weight of maleic acid/isopropyl halfester, 4.5 % by weight of acrylic acid and 52.7 % by weight of styrene.

The product is heated to 125°C for 2 hours and then to 150°C for 3 hours.

A mixture of 2000 parts of approximately 25 % aqueous ammonia solution and 11500 parts of water is then forced in under pressure in the course of a few minutes with vigorous stirring. Addition of this mixture results in cooling of the contents of the autoclave. Stirring is then continued for 3 hours at 70°C. A clear, approximately 27 % polymer solution is obtained. It can be used directly as a size, if necessary after appropriate dilution.

Size B 3000 parts of isopropanol, 1200 parts of maleic anhydride and 30 parts of o-nitrotoluene are introduced into an autoclave and heated to 120°C. Halfester formation takes place. A mixture of 3000 parts of styrene, 500 parts of acrylic acid, 20 parts of t-butyl hydroperoxide and 30 parts of t-butyl peroctoate is then added at the rate of 3000 parts per hour. The mixture is then stirred for 2 hours at 125°C and 3 hours at 150°C. A sample of the polymer precipitated in water, washed with methanol and dried under vacuum (water pump) in a drying cupboard at 60°C is found, when dissolved in dimethylformamide to which 0.3 % by weight of $NaNO_3$ is added, to have an intrinsic viscosity of 0.117 (100ml/g) in dimethylformamide at $t = 25°C$, which corresponds to a molecular weight of about 23 000. The copolymer contains copolymerised units of 35.9 % by weight of maleic acid/isopropyl halfester, 55.1 % by weight of styrene and 9 % by weight of acrylic acid. A mixture of 2000 parts of 25 % aqueous ammonia, 8000 parts of water and 3000 parts of isopropanol is then added in the course of a few minutes.

The contents of the autoclave are stirred at 50°C until dissolved (approximately 1 hour). A thin liquid 25 % polymer solution is obtained which can be used as size either directly or after further dilution.

Size C

The method employed is analogous to that used for preparing size A but t-butyl peroctoate is replaced by an equal quantity of azodiisobutyronitrile.

Size D

The method is analogous to that employed for size A but addition of the components and polymerisation are carried out at 150°C. The size obtained has a considerably lower viscosity.

Size E 3000 parts of isopropanol, 30 parts of o-nitrotoluene and 500 parts of maleic anhydride are introduced into an autocalve. The mixture is heated to 120°C to form the semiester. The following are then introduced in the course of 1.5 hours: a mixture of 3750 parts of styrene, 750 parts of acrylic acid, 1000 parts of isopropanol, 20 parts of t-butyl hydroperoxide and 30 parts of t-butyl peroctoate. The reaction mixture is then kept at 120°C for a further 2 hours. It is then stirred for 3 hours at 150°C. A mixture of 2000 parts of approximately 20 % aqueous ammonia solution, 9000 parts of water and 1000 parts of isopropanol is then added and the mixture stirred for about 1 hour at 70°C. A thin liquid, approximately 26 % solution of size is obtained.

The copolymer consists of copolymerised units of 14.9 % by weight of maleic acid/isopropyl semiester, 70.5 % by weight of styrene and 14.6 % by weight of acrylic acid.

Size F 3000 parts of isopropanol are introduced into an autoclave and heated to 120°C. The following are introduced in the course of 1.5 hours: a cooled mixture of 800 parts of maleic acid/isopropyl halfester, 2000 parts of isopropanol, 750 parts of acrylic acid, 3750 parts of styrene, 20 parts of t-butyl hydroperoxide and 30 parts of t-butyl peroctoate. The autoclave contents are then stirred for 5 hours at 150°C and a mixture of 1500 parts of approximately 25 % aqueous ammonia solution and 9500 parts of water is then added. The contents are stirred at 60°C until dissolved and an approximately 25 %, highly fluid solution of size is obtained.

The copolymer consists of copolymerised units of approximately 15.1 % by weight of maleic acid isopropyl semiester, 70.9 % by weight of styrene and 14.1 % by weight of acrylic acid.

Size G

The method is analogous to that employed for size F but instead of maleic acid isopropyl halfester, the corresponding ethyl halfester is used.

Size H

200 Parts of ethanol and 15 parts of hydroxyethyl mercaptan are introduced into an autoclave at 150°C. A mixture of 1800 parts of maleic acid isopropyl halfester, 15 parts of benzoyl peroxide, 40 parts of t-butyl hydroperoxide, 3700 parts of styrene and 500 parts of acrylic acid is then added in the course of 3 hours at 150°C. The mixture is then stirred for 5 hours at 150°C and cooled to 120°C. A mixture of 200 parts of 25 % aqueous ammonia solution and 14 500 parts of water is added and the contents stirred at 70°C until dissolved. A slightly cloudy solution of size with a solids content of about 26 % is obtained.

The copolymer consists of copolymerised units of approximately 29.8 % by weight of maleic acid isopropyl halfester, 61.9 % by weight of styrene and 8.3 % by weight of acrylic acid.

The use of the size will be described below by way of example:

Unsized paper used by way of example has been manufactured from bleached sulphite cellulose without the addition of alum and weighs 80 g per m².

The pre-sized paper used has the same composition but has been pre-sized in the pulp with approximately 0.4 % of conventional resin size based on abienate and approximately 2 % of alum. It also weighs 80 g per m².

The sizing liquor used for surface sizing consisted of 5 % by weight of starch (Perfektamyl(R) A 4692 of AVEBE) and 0.1 to 0.3 % by weight of the size to be tested (calculated as solids content) in 94.9 or 94.7 % by weight of water.

The apparatus used for sizing was a Type HF laboratory sizing press with vertical web guide of Werner Mathis, Zurich, Switzerland.

The sizing liquor was at a temperature of about 20°C in the sizing press and had a liquid level of 3 cm. The paper was drawn through at medium contact pressure at the rate of 4 m per minute.

The sized paper was dried on a drying cylinder at 100°C for 1 minute.

The dried samples were conditioned in a normal room atmosphere for 2 hours.

Each sample was then weighed, introduced into a water bath at 20°C and left there for 1 minute. Surplus water was then removed by pressing the sample between packets of filter paper with a 10 kg roller weight and the sample was again weighed.

The value obtained for absorption of water on both sides, which was determined on samples measuring 1 dm², was converted to g of water absorption per m² in the following table. The lower the water absorption, the more efficient is the size tested. The size is efficient if the water absorption is approximately 40 g/m² or less.

The percentage figures given in the tables refer to the proportion of size contained in the liquor, calculated as 100 % active substance.

EXAMPLES 1 – 7

Table 1 below shows that the sizes described above are efficient on unsized paper.

TABLE 1:

| Size: | Surface sizing of unsized paper, water absorption of untreated paper: 70 g/m² | | |
|---|---|---|---|
| | Water absorption in g/m² after the addition of | | |
| | 0.1 | 0.2 | 0.3 % of size to the liquor |
| A | 50 | 41 | 37 |
| D | — | 50 | 41 |
| H | — | 50 | 39 |
| B | — | 47 | 39 |
| E | 60 | 43 | 36 |
| F | 39 | 37 | 37 |
| G | 50 | 44 | 36 |

EXAMPLES 8 – 14

Table 2 shows the water abosrption of pre-sized paper which was treated in a laboratory sizing press with a solution of 5 % of starch and 0.1 % of the size to be tested.

TABLE 2:

| Size: | Surface sizing of pre-sized paper, water absorption of untreated paper: 60 g/m² |
|---|---|
| | Water absorption in g/m² |
| A | 33 |
| D | 33 |
| H | 35 |
| B | 33 |
| E | 35 |
| F | 34 |
| G | 36 |

We claim:

1. A copolymer, which is suitable for use in anionic sizes, which is an ammonium or alkali metal salt of a copolymer consisting of
   a. 0.5 to 50% by weight of copolymerized units of at least one half ester of an $\alpha,\beta$-olefinically unsaturated $C_4$ or $C_5$ dicarboxylic acid and an aliphatic or cycloaliphatic alcohol having 1 to 18 C-atoms,
   b. 6 to 40% by weight of copolymerized units of at least one acid selected from the group consisting of acrylic acid and methacrylic acid and
   c. 40 to 85% by weight of copolymerized units of an aromatic compound which contains a single polymerizable double bond.

2. A copolymer as claimed in claim 1 in which (a) is a maleic acid propyl half ester.

3. A copolymer as claimed in claim 1 in which (c) is styrene.

* * * * *